(12) United States Patent
Zhang et al.

(10) Patent No.: US 11,181,711 B2
(45) Date of Patent: Nov. 23, 2021

(54) LENS MODULE AND ELECTRONIC DEVICE HAVING SAME

(71) Applicant: TRIPLE WIN TECHNOLOGY (SHENZHEN) CO. LTD., Shenzhen (CN)

(72) Inventors: Long-Fei Zhang, Guangdong (CN); Shin-Wen Chen, New Taipei (TW); Kun Li, Guangdong (CN); Xiao-Mei Ma, Guangdong (CN); Hao-Zhong Liu, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/854,003

(22) Filed: Apr. 21, 2020

(65) Prior Publication Data

US 2021/0223497 A1     Jul. 22, 2021

(30) Foreign Application Priority Data

Jan. 17, 2020   (CN) .......................... 202010054990.2

(51) Int. Cl.
     *G02B 7/02*      (2021.01)

(52) U.S. Cl.
     CPC ...................................... *G02B 7/02* (2013.01)

(58) Field of Classification Search
     CPC . G02B 7/02; G02B 7/00; G02B 7/021; G02B 7/023; G02B 7/025
     See application file for complete search history.

(56) References Cited

U.S. PATENT DOCUMENTS

2018/0341166 A1*   11/2018   Imai .......................... G03B 9/10

FOREIGN PATENT DOCUMENTS

| CN | 207135184 U | 3/2018 |
|---|---|---|
| CN | 208739213 U | 4/2019 |

* cited by examiner

*Primary Examiner* — Darryl J Collins
*Assistant Examiner* — Matthew Y Lee
(74) *Attorney, Agent, or Firm* — ScienBiziP, P.C.

(57) ABSTRACT

A lens module includes a lens assembly and a lens barrel assembly receiving the lens assembly. The lens barrel assembly includes a lens holder and a lens barrel provided on the lens holder. A light transmission hole is defined passing through the lens holder and the lens barrel. The lens assembly is received in the light transmission hole. A center of the lens barrel is offset from a center of the lens holder.

10 Claims, 5 Drawing Sheets

LENS MODULE AND ELECTRONIC DEVICE HAVING SAME

FIELD

The subject matter herein generally relates to lens modules, and more particularly to a lens module applicable in an electronic device.

BACKGROUND

Generally, a mobile device includes a lens module mounted outside of an area of the display screen. With increasing demand for higher screen ratios, the lens module is generally mounted adjacent to an edge of the screen. However, due to size and strength requirements of the lens module, the camera cannot be mounted as close to a corner edge of the screen as desired.

BRIEF DESCRIPTION OF THE DRAWINGS

Implementations of the present disclosure will now be described, by way of embodiments, with reference to the attached figures.

DETAILED DESCRIPTION

Figure 1:
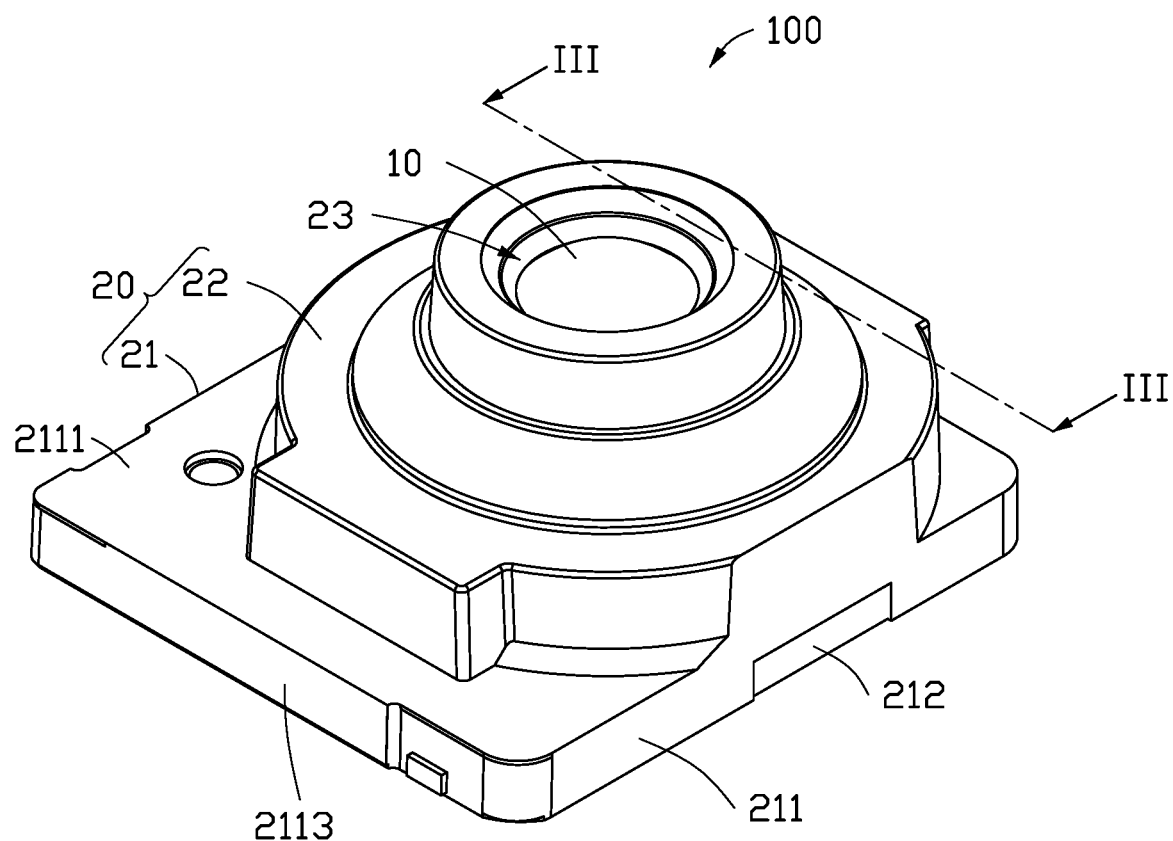
FIG. 1 is an assembled, isometric view of an embodiment of a lens module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
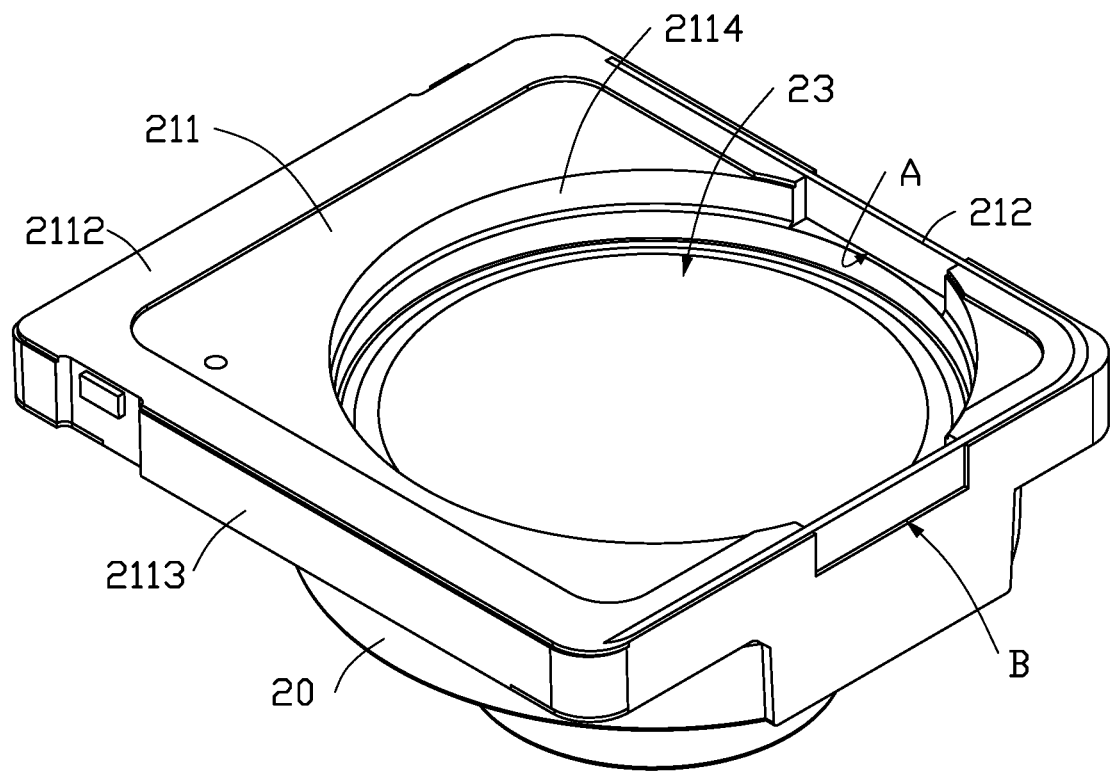
FIG. 2 is similar to FIG. 1, but shows the lens module from another angle.
Figure 3:
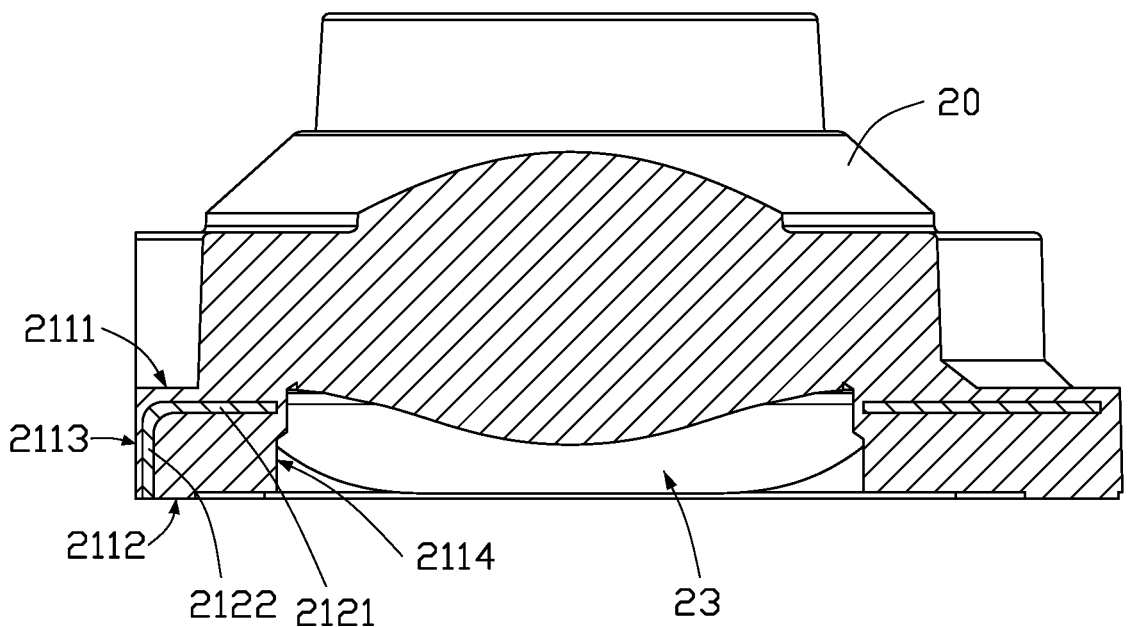
FIG. 3 is a cross-sectional view taken along line in FIG. 1.

FIGS. 1-3 show an embodiment of a lens module 100 including a lens assembly 10 and a lens barrel assembly 20. The lens barrel assembly 20 is housed in the lens assembly 10. The lens barrel assembly 20 includes a lens holder 21 and a lens barrel 22 provided on the lens holder 21. A light transmission hole 23 is defined passing through the lens holder 21 and the lens barrel 22. The lens assembly 10 is received in the light transmission hole 23. A center of the lens barrel 22 is offset from a center of the lens holder 21. By offsetting the center of the lens barrel 22 from the center of the lens holder 21, the lens assembly 10 received in the lens barrel 22 can be biased toward a designated area (such as a corner area of a mobile phone screen) without changing a mounting position of the lens holder 21, thereby improving a user experience.

In one embodiment, the lens holder 21 and the lens barrel 22 are integrally formed.

In one embodiment, the lens holder 21 includes a base body 211 and a reinforcement plate 212. The reinforcement plate 212 is embedded in the base body 211 to enhance a structural strength of the lens holder 21.

In one embodiment, the base body 211 includes a first surface 2111 adjacent to the lens barrel 22, a second surface 2112 opposite the first surface 2111, a plurality of third surfaces 2113 connected to the first surface 2111 and the second surface 2112, and a plurality of fourth surfaces 2114 facing the light transmission hole 23.

Figure 4:
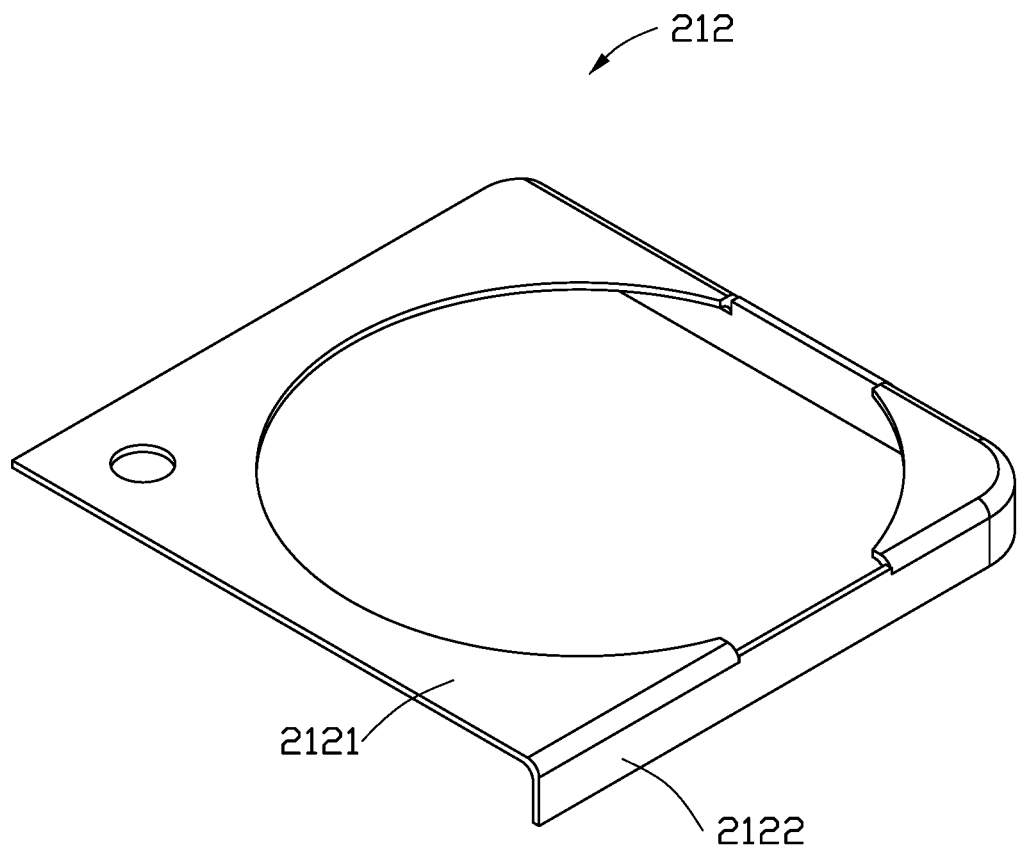
FIG. 4 is an isometric view of a reinforcement plate of the lens module.

Referring to FIGS. 3-4, the reinforcement plate 212 includes a first plate 2121 and a second plate 2122. The first plate 2121 is between the first surface 2111 and the second surface 2112, and the second plate 2122 is between the third surface 2113 and the fourth surface 2114. The first plate 2121 and the second plate 2122 are connected together. The first plate 2121 and the second plate 2122 enhance the structural strength of the lens holder 21, thereby reducing a required size of the lens holder 21.

In one embodiment, the first plate 2121 and the second plate 2122 are integrally formed.

In one embodiment, the base body 211 and the reinforcement plate 212 are formed by an injection molding process.

Referring to FIG. 2, in one embodiment, the light transmission hole 23 is tangent to the second plate 2122 at two points A and B. Portions of the second plate 2122 adjacent to the points A and B are exposed from the third surfaces 2113 and the fourth surfaces 2114 to further reduce the required size of the lens holder 21, so that the lens assembly 10 can be more biased toward the designated area of the mobile phone screen.

In one embodiment, the base body 211 is made of plastic, and the reinforcement plate 212 is made of stainless steel.

Figure 5:
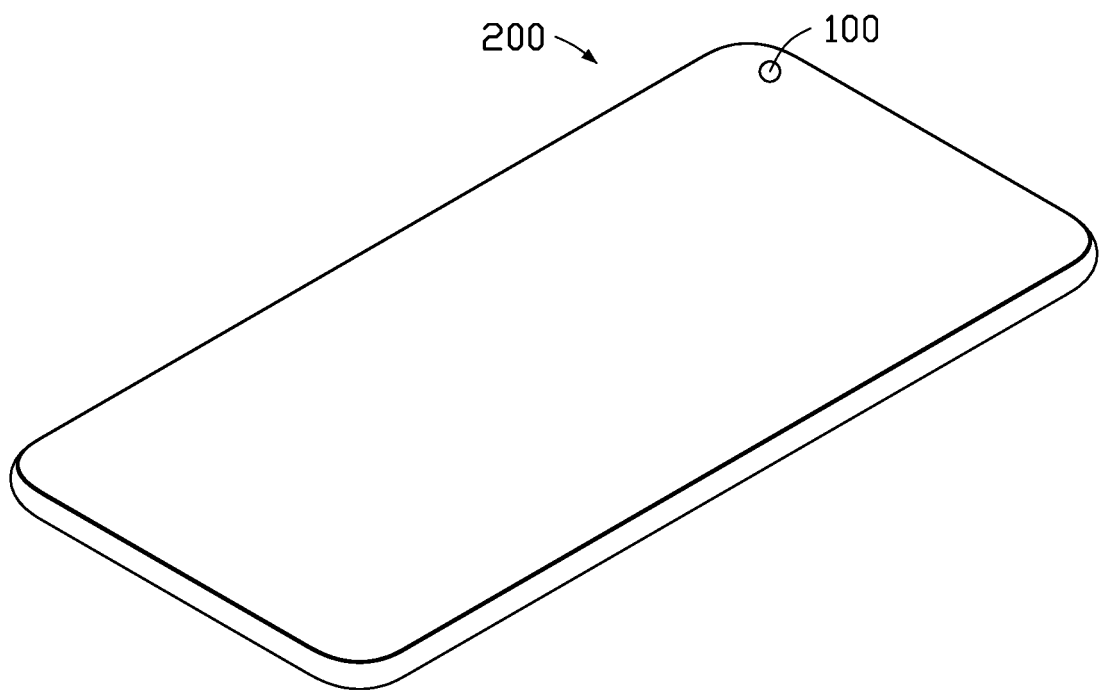
FIG. 5 is an assembled, isometric view of an embodiment of an electronic device including the lens module.

FIG. 5 shows an embodiment of an electronic device 200 including the lens module 100. The electronic device 200 may be a mobile phone, a computer, a video camera, or the like.

By offsetting the center of the lens barrel 22 from the center of the lens holder 21, the lens assembly 10 received in the lens barrel 22 is biased toward the designated area (such as the corner area of the mobile phone screen), thereby improving the user experience.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens module comprising:

a lens assembly; and a lens barrel assembly receiving the lens assembly; wherein:

the lens barrel assembly comprises a lens holder and a lens barrel provided on the lens holder;

a light transmission hole is defined passing through the lens holder and the lens barrel;

the lens assembly is received in the light transmission hole;

a center of the lens barrel is offset from a center of the lens holder the lens holder comprises a base body and a reinforcement plate;

the reinforcement plate is embedded in the base body;

the base body comprises a first surface adjacent to the lens barrel, a second surface opposite the first surface, a plurality of third surfaces coupled to the first surface and the second surface, and a plurality of fourth surfaces facing the light transmission hole;

the reinforcement plate comprises a first plate and a second plate;

the first plate is between the first surface and the second surface;

the second plate is between the third surfaces and the fourth surfaces;

the first plate and the second plate are coupled together;

the light transmission hole is tangent to the second plate at tangent points; and portions of the second plate adjacent to the tangent points are exposed from the third surfaces and the fourth surfaces.

2. The lens module of claim 1, wherein:

the base body is made of plastic; and the reinforcement plate is made of stainless steel.

3. The lens module of claim 1, wherein:

the base body and the reinforcement plate are formed by an injection molding process.

4. The lens module of claim 1, wherein:

the first plate and the second plate are integrally formed.

5. The lens module of claim 1, wherein:

the lens holder and the lens barrel are integrally formed.

6. An electronic device comprising a lens module, the lens module comprising:

a lens assembly; and a lens barrel assembly receiving the lens assembly; wherein:

the lens barrel assembly comprises a lens holder and a lens barrel provided on the lens holder;

a light transmission hole is defined passing through the lens holder and the lens barrel;

the lens assembly is received in the light transmission hole;

a center of the lens barrel is offset from a center of the lens holder the lens holder comprises a base body and a reinforcement plate;

the reinforcement plate is embedded in the base body;

the base body comprises a first surface adjacent to the lens barrel, a second surface opposite the first surface, a plurality of third surfaces coupled to the first surface and the second surface, and a plurality of fourth surfaces facing the light transmission hole;

the reinforcement plate comprises a first plate and a second plate;

the first plate is between the first surface and the second surface;

the second plate is between the third surfaces and the fourth surfaces;

the first plate and the second plate are coupled together;

the light transmission hole is tangent to the second plate at tangent points; and portions of the second plate adjacent to the tangent points are exposed from the third surfaces and the fourth surfaces.

7. The electronic device of claim 6, wherein:

the base body is made of plastic; and the reinforcement plate is made of stainless steel.

8. The electronic device of claim 6, wherein:

the base body and the reinforcement plate are formed by an injection molding process.

9. The electronic device of claim 6, wherein:

the first plate and the second plate are integrally formed.

10. The electronic device of claim 6, wherein:

the lens holder and the lens barrel are integrally formed.

\* \* \* \* \*